United States Patent [19]
Blainey et al.

[11] Patent Number: 5,850,549
[45] Date of Patent: Dec. 15, 1998

[54] GLOBAL VARIABLE COALESCING

[75] Inventors: Robert James Blainey, Newmarket; Christopher Michael Donawa; James Lawrence McInnes, both of Toronto, all of Canada

[73] Assignee: International Business Machines Corporation, Armonk, N.Y.

[21] Appl. No.: 726,039

[22] Filed: Oct. 7, 1996

[30] Foreign Application Priority Data

Dec. 28, 1995 [CA] Canada ................................. 2,166,252

[51] Int. Cl.$^6$ ....................................................... G06F 9/45
[52] U.S. Cl. .......................... 395/705; 395/704; 395/706; 395/707; 395/708; 395/710
[58] Field of Search ................................... 395/704, 710, 395/706, 707, 708, 705

[56] References Cited

U.S. PATENT DOCUMENTS

| | | | |
|---|---|---|---|
| 5,107,418 | 4/1992 | Cramer et al. ........................ | 395/709 |
| 5,367,683 | 11/1994 | Brett ..................................... | 395/709 |
| 5,428,793 | 6/1995 | Odnert et al. .......................... | 395/709 |
| 5,446,899 | 8/1995 | Brett ..................................... | 395/705 |
| 5,535,392 | 7/1996 | Brett ..................................... | 395/708 |
| 5,555,417 | 9/1996 | Odnert et al. .......................... | 395/707 |
| 5,577,253 | 11/1996 | Blickstein ............................. | 395/705 |
| 5,625,822 | 4/1997 | Brett ..................................... | 395/705 |

FOREIGN PATENT DOCUMENTS 2102089 10/1993 Canada ........................... G06F 9/44

OTHER PUBLICATIONS

K.M. Gilbert, Effective Register Management During Code Generation, IBM Technical Disclosure Bulletin, vol. 15, No. 8, Jan. 1973, pp. 2640–2645.

K. O'Brien et al, Advanced Compiler Technology for the RISC System/6000 Architecture, IBM RISC System/6000 Technology, pp. 154–161, 1990.

Copper, et al. "The Impact of Interprocedural Analysis & Optimization in R.sup.n Programming Environment" ACM Trans. on Programming Languages & Syst. pp. 491–523, Oct. 1986.

Appel, et al. "Calle–save Registers in Continuation–Passing Style" LISP Symb. Comput (Netherlands) vol.5, No.3, pp. 191–221, Sep. 1992.

Richardson, et al. "Code optimization across procedures" Computer (USA), vol.22, No.2, pp. 42–50, Feb. 1989.

Chow "Minimizing register usage penalty at procedure calls" Proceedings of the SIGPLAN,'88 Conf. on Programming Language Design & Implementation, pp. 85–94, Jul. 1988.

Wall "Global register allocation at link time", Proc. of the Sigplan, Sigplan Notices, vol.21, No.7, pp. 264–275, Jul. 1986.

Morel, et al. "Global optimization by supression of Partial Redundancies" Communication of the ACM–vol.22, No.2 Programming languages, pp. 96–103, Feb. 1979.

*Primary Examiner*—Edward R. Cosimano
*Assistant Examiner*—Cuong H. Nguyen
*Attorney, Agent, or Firm*—Baker Maxham; Jester & Meador

[57] ABSTRACT

An interprocedural compilation method for aggregating global data variables in external storage to maximize data locality. Using the information displayed in a weighted interference graph in which node weights represent the size of data stored in each global variable and edges between variables represent access relationships between the globals, the global variables can be mapped into aggregates based on this frequency of access, while preventing the cumulative data size in any aggregate from exceeding a memory size restriction.

6 Claims, 2 Drawing Sheets

GLOBAL VARIABLE COALESCING

BACKGROUND OF THE INVENTION

1. Field of the Invention

This invention is directed to a method for efficient interprocedural handling of global data variables.

2. Description of the Related Art

It is related to our concurrently filed applications titled "Improving Memory Layout Based on Connectivity Considerations", U.S. Ser. No. 80/726,038, filed Oct. 7, 1996 and "Connectivity Based Program Partitioning", U.S. Ser. No. 08/727,720, filed Oct. 7, 1996 (IBM docket nos. CA9-95-016 and CA9-95-021), but addresses a specific aspect of the problems of computer program compilation having to do with data storage.

Compilation is the process that translates a source program (written is a high-level, human-readable programming language) into an equivalent program in machine language or object code, so that it can be executed by a computer. For each of the main source program and a number of additional source programs or subroutines, the compiler translates each statement in the program into machine language equivalents. The output is a number of object programs corresponding to the input source programs. A linker program then combines the object programs created by the compiler (that is, supplies the interconnecting links between the program components) to create a single machine—executable program.

Central processing units utilized in general purpose programmable computers make extensive use of hardware registers to hold data items utilized during programs execution, thus avoiding the overhead associated with memory references, and effective management of such registers forms a major aspect of compiler optimization, although the number, size and restrictions of use of such registers may vary widely from processor to processor. Some general principles relating to such management are discussed in "Effective Register Management During Code Generation", K. M. Gilbert, IBM Technical Disclosure Bulletin, January 1973, pages 2640 to 2645. Optimization techniques in compilers for reduced instruction set (RISC) computers are discussed in an article entitled "Advanced Compiler Technology for the RISC System/6000 Architecture", by O'Brien et al, at pages 154–161 of IBM RISC System/6000 Technology, published 1990 by IBM Corporation. Both of these documents emphasize the importance of efficient hardware register usage. The linker provides the mapping pattern for storage of data variables.

In many programs, data is stored in a proliferation of small global variables. ("Global" indicates that a variable is accessible to all elements of the computer program, rather than just the elements in which it is defined.) Groups of these global variables are typically accessed together in a particular section of the program. However, the linker does not take access patterns into account when mapping the storage for global variables, so an opportunity to exploit locality is lost.

In addition, on some systems, extensive use of global variables (especially small scalars) implies a relatively high cost of access for global data.

Modern day compiler programs include optimizing techniques directed at maximizing the efficient use of the hardware resources of the computer, and the present invention is aimed at an improvement is this area.

Many compilers are designed to take multiple passes of the source program input in order to collect information that can be used for optimally restructuring the program. For example, interprocedural analysis (IPA) is a 2-pass compilation procedure developed by IBM and used in its XL compilers. IPA is described in detail in Canadian Patent Application No. 2,102,089, commonly assigned. The first IPA pass is performed at compile time and collects summary information that is written to the object file for each procedure compiled. This summary information includes a list of all callsites in each procedure, alias information for each variable and procedure. The second IPA pass is an information dissemination pass performed at link time when all files in the application have been compiled. The IPA driver reads the summary information from the object files and computes the application's "call-weighted multigraph" or "callgraph", a graph illustrating all of the procedures in the program and the possible calls between them. A callgraph consists of a number of nodes, each of which represents a procedure in the program. The nodes are interconnected by edges, and each of the edges has a direction. The edges represent possible procedure or method calls between the nodes or procedures. The information collected from the IPA, or from any of the multiple compilation passes, is used for improving the structure of the code to be produced in the program executables.

The information collected using the information gathering pass includes data dependencies, and these can be analyzed for use by the compiler during code optimization. U.S. Pat. No. 5,107,418, titled "Method for Representing Scalar Data Dependencies for an Optimizing Compiler" of Supercomputer Systems Limited, discusses a method for constructing a scalar dependence graph of a program that represents all of the local and global scalar data dependencies. The information in the constructed graph can then be used by the compiler for implementing all types of optimizations, including scheduling, register allocation, loop invariant expression identification, array dependence graph construction, etc.

U.S. Pat. No. 5,367,683 titled "Smart Recompilation of Performing Matchup/Difference After Code Generation" of Digital Equipment Corporation discusses a "smart recompilation" method that uses a fragmented global context table. The information contained in the table permits a closer examination of the dependencies between separate program modules to reduce the number of modules that must be recompiled due to dependency when one module is altered and recompiled.

However, neither of these references addresses the issue of the actual optimal mapping of global data variables, which is traditionally done by the human programmer manually.

Given an interprocedural view of a computer program, an optimizing compiler, according to the present invention, can analyze the usage patterns of global variables and then remap some of the global variables as members of global aggregates. This allows the compiler to explicitly place the global variables in memory independent of the linker mapping. It also allows the compiler to generate more efficient code to access the globals on some systems.

The present invention therefore provides a method for remapping global data variables during program compilation, comprising:

i) selecting global data variables referenced in the program;

ii) assigning a weight value to each selected global data variable representing byte size of data in that variable;

iii) dividing the selected global data variables into pairs of variables that are accessed together and re-ordering the pairs from highest to lowest affinity; and iv) beginning from a pair of variables of highest affinity, dividing the selected global data variables into aggregate groupings, each grouping having an aggregate weight value not exceeding a preset limit.

The invention is also directed to a program storage device readable by a machine, tangibly embodying a program of instructions executable by the machine for performing the above-described method.

DETAILED DESCRIPTION OF THE PREFERRED EMBODIMENTS

The method of the present invention is used to rearrange external storage in order to maximize data locality. The first advantage of this optimization is that a number of separate small data objects are brought together. Secondly, the data objects are ordered so that those used together most frequently are grouped together. This aspect of the invention is particularly useful in optimizing programs in languages such as C and C++ that have a proliferation of small data objects.

Figure 1:
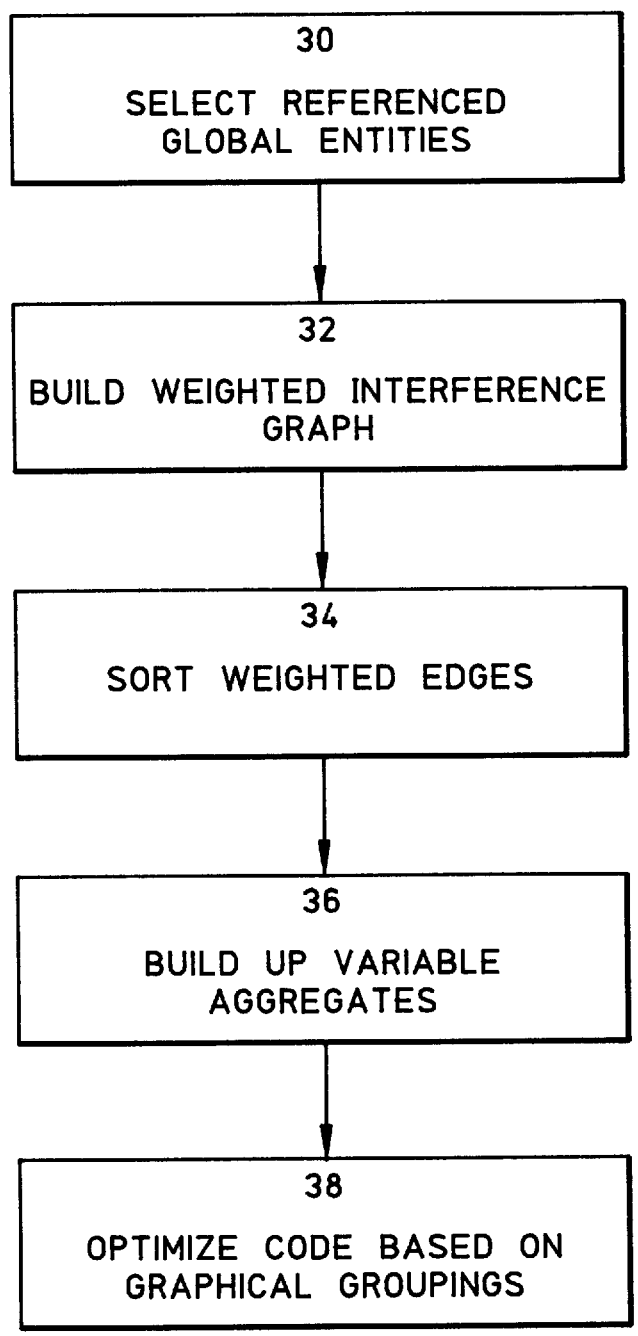
FIG. 1 is a flow diagram showing the steps for aggregating global variables according to the invention.

The method used is set out in FIG. 1. A number of global variables that are eligible for remapping are selected. Global variables that are eligible for remapping are those variables whose uses are known to the compiler. The type of members selected includes members of global structures, and these are taken as separate entities. Only those variables that are referenced are selected; unreferenced variables are discarded (block 30).

A weighted interference graph is constructed on the selected variables (block 32). From the following listing of data objects, a weighted interference graph as illustrated in FIG. 2 can be constructed:

```
int z [100]
struct a {
  .
  .
  .
  dbl s
  dbl t
}
int x;
int y;
```

Certain variables are excluded from the weighted interference graph. Variables that may be referenced by the invisible portion of the program cannot be included because references to such variables are based on their original names and, following variable aggregation, these names will no longer access them.

Figure 2:
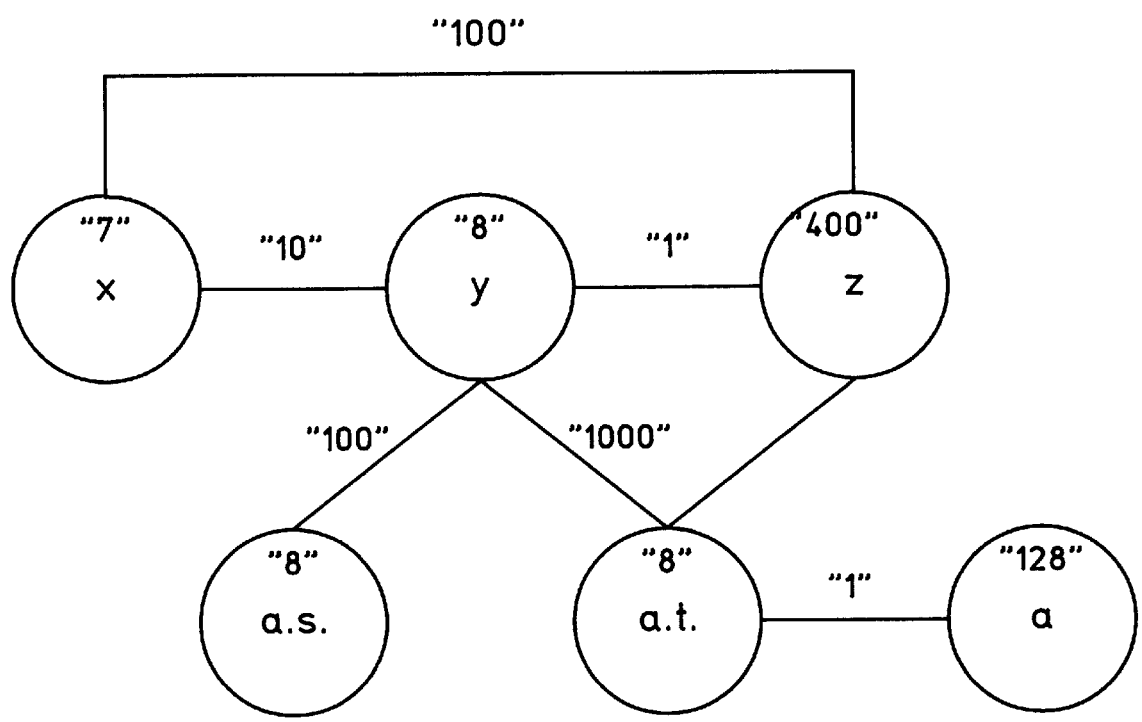
FIG. 2 is a weighted interference graph of global variables according to the aspect of the invention illustrated in FIG. 1.

In the weighted interference graph of FIG. 2, the node weights represent the size in bytes of the data stored in the global. The edges between variables represent access relationships between the globals represented by the incident nodes, that is, the fact that the variables are used together in the same procedure or in the same control region. The weightings on the edges represent, in general terms, a measure of affinity, indicating how often the two variables are accessed together across the whole program and in what context. For example, two variables accessed together in a loop get a higher incident edge weight than a simple access.

Also, if the two variables are accessed together in a single nesting of a loop, then the edge between them is weighted 10. If they are inside two nestings of a loop, the weighting, for example, is 100. If these procedures were used inside two procedures, doubly-nested, then the weighting on the edge between them would, for example, be 200.

The problem of mapping the globals into one or more aggregates reduces to the problem of finding maximal weight subgraphs of the weighted interference graph subject to the restriction that the sum of the node weights in any subgraph is less than a selected system dependent parameter, usually related to the size of the displacement field in a base-displacement form load instruction.

The method for determining the maximal weight subgraphs is an adaptation of the maximal weight spanning forest algorithm.

To compute a maximal spanning forest, the edges from a weighted graph are sorted from highest to lowest weight. Spanning trees are created by adding edges to groups, except where the addition of an edge would create a cycle. In a maximal spanning forest, the spanning trees cannot exceed a preset size.

However, in the method of the present invention, the criterion for inserting an edge into a subgraph is that the node weight restriction is not violated, instead of the cycle restriction in creating a spanning forest.

The edges between the global variables are sorted by weight from heaviest to lightest (block 34 of FIG. 1). This results in an ordering of the global variables by frequency of access with v being accessed together with a.t. (From FIG. 2). According to this embodiment of the invention, structures are not broken up. Consequently, a.t. actually brings in all of a.

The whole order of the global variables based on the weighted interference graph of FIG. 2 is:

```
y -> a.t.    (1000)
x -> z (  100)
y -> a.s.    ( 100)
x -> y (  10)
z -> a.t.    ( 10)
y -> z (  1)
a.t. -> a    ( 1)
```

As the global variables are ordered, variable aggregates are built up. The first aggregate has y and a in it, and the ordering of the aggregate is significant because members which are most often accessed together can then share cache lines/pages within the aggregate.

The maximum permissible weight for any global aggregate corresponds to the type of addressing used to access members of structures on the particular target machine. For example, if the target machine uses a relative base displacement load, then the maximum aggregate size is limited by the displacement field on the machine.

In respect of the example illustrated in FIG. 2, assume that the limit is 404. The first aggregate, that includes y and a, has a size of 136. The next edge selected (from the hierarchy) would being the aggregates x and y together. However, the new total would exceed the size limitation. Therefore, just two aggregates are produced, and edges continue to be added to them.

In the preferred embodiment of the invention, some trade-offs were made between storage usage and locality. A distinction was made between array and non-array program objects that minimized the padding space required for proper alignment of aggregate members, but that could result in suboptimal data locality.

The embodiment was designed so that aggregates were created starting with the largest non-array objects (i.e., integers and structures) and proceeding to the smallest objects. The arrays were added at the end. The last array is stored as a single value rather than as the entire node size of each array being added to the aggregate. The value is all that is required to enable the caller to access the base of the array.

A division was also made between initialized and uninitialized external data because of the number of zeroes in the middle to the data.

Use of the method of the present invention can result in aggregate members having disjoint live ranges because global variables that are unconnected are aggregated. A further optimization on storage can be made by overlapping some symbols for variables with disjoint live ranges. If two members of an aggregate never hold a useful value at the same program point, then they may use overlapping storage.

Once some of the global variables have been remapped as members of global aggregates, these global variables can be explicitly placed in memory by the compiler through code optimization, independently of the linker mapping (block 38).

The embodiments of the invention in which an exclusive property or privilege is claimed are defined as follows:

What is claimed is:

1. A method for remapping global data variables during program compilation, comprising the computer-executed steps of:

setting a limit;

selecting global data variables referenced in the program;

assigning a weight value to each selected global data variable representing byte size of data in that variable;

dividing the selected global data variables into pairs of variables that are accessed together and re-ordering the pairs from highest to lowest affinity; and beginning from a pair of variables of highest affinity, dividing the selected global data variables into aggregate groupings, each grouping having an aggregate weight value not exceeding the limit.

2. A method, according to claim 1, wherein assigning comprises initially differentiating arrays from non-array global data variables.

3. A method, according to claim 2, wherein the weight value assigned to a final array is one.

4. A method, according to claim 1, wherein assigning and dividing comprise building a weighted interference graph of the selected global data variables having:

nodes representing the selected global data variables;

node weights representing the assigned weight value of each selected global data variable;

edges connecting nodes representing access relationships between pairs of selected global data variables; and edge weights representing degree of affinity between pairs of selected global data variables.

5. A method, according to claim 1, wherein the limit is related to a displacement field size value.

6. A program storage device readable by a machine in a data processing system, tangibly embodying a program of instructions executable by the machine to perform method steps executable by a computer for remapping global data variables during program compilation, said method steps comprising:

setting a limit;

selecting global data variables referenced in the program;

assigning a weight value to each selected global data variable representing byte size of data in that variable;

dividing the selected global data variables into pairs of variables that are accessed together and re-ordering the pairs from highest to lowest affinity; and beginning from a pair of variables of highest affinity, dividing the selected global data variables into aggregate groupings, each grouping having an aggregate weight value not exceeding the limit limit.

* * * * *